United States Patent [19]

Fletcher

[11] 3,889,064

[45] June 10, 1975

[54] ASYNCHRONOUS, MULTIPLEXING, SINGLE LINE TRANSMISSION AND RECOVERY DATA SYSTEM

[76] Inventors: James C. Fletcher, Administrator of the National Aeronautics and Space Administration, with respect to an invention of Tage O. Anderson, Salt Lake City, Utah

[22] Filed: Mar. 27, 1974

[21] Appl. No.: 455,163

[52] U.S. Cl. ............ 179/15 BS; 325/4; 178/69.5 R

[51] Int. Cl. ............ H04j 3/06

[58] Field of Search ............ 179/15 BS; 325/4; 178/69.5 R

[56] References Cited

UNITED STATES PATENTS

| | | | |
|---|---|---|---|
| 3,626,295 | 12/1971 | Sabrui | 179/15 BS |
| 3,626,298 | 12/1971 | Paine | 178/69.5 R |
| 3,639,838 | 12/1972 | Kuhn | 325/4 |
| 3,818,453 | 6/1974 | Schmidt | 340/172.5 |

*Primary Examiner*—Ralph D. Blakeslee
*Attorney, Agent, or Firm*—Monte F. Mott; Paul F. McCaul; John R. Manning

[57] ABSTRACT

Asynchronously multiplexed sample data sub-systems employ transmission over a single line to a remote synchronizer and demultiplexer. At the remote synchronizer, the data is recovered by synchronizing signals derived from the data itself.

A sub-system, or satellite location, supplies continuously sampled binary data along with a satellite identification and synchronizing sequence as a satellite message frame. This information is supplied bit-serially, to a multiplexer junction. The multiplexed satellite information is delivered asynchronously onto a single line transmission channel with other like bit serial satellite message information from other satellite monitoring sites. Such satellite information is transmitted to a central collection and analysis site where it is demultiplexed according to the words and bits that make up a satellite message frame.

At least two message frames from each satellite monitoring site are always placed on the single transmission channel as a single block of data for that satellite. This technique, at the demultiplexer, assures proper recognition of a desired message frame based upon a comparison of satellite identification sequences and a frame synchronization sequence.

11 Claims, 6 Drawing Figures

PATENTED JUN 10 1975

3,889,064

SHEET 1

PATENTED JUN 10 1975 3,889,064

SHEET 2

ASYNCHRONOUS, MULTIPLEXING, SINGLE LINE TRANSMISSION AND RECOVERY DATA SYSTEM

BACKGROUND OF THE INVENTION

Origin of the Invention

The invention described herein was made in the performance of work under a NASA contract and is subject to the provisions of Section 305 of the National Aeronautics and Space Act of 1958, Public Law 85-568 (72. Stat. 435; 42 U.S.C. 2457).

FIELD OF THE INVENTION

The present invention relates generally to improvements in communication systems and particularly pertains to a new and improved multiplex communication system wherein binary data from a plurality of sampling sources is multiplexed on a single transmission channel, and is properly recovered at the receiving site. Notably, the transmission is serial and only a single line is used. Three levels of synchronization, frame sync, word sync and bit sync are all derived from the data itself.

DESCRIPTION OF THE PRIOR ART

In the field of multiplexed binary data communication, it has been the practice to employ synchronous multiplexing schemes using multiple parallel synchronization lines. Such systems are unsatisfactory in a situation where a large number of remote and inaccessible data sampling sites are communicating their information continuously and asynchronously to a central collection and analyzing location. Because of the great number of these remote data sampling locations and their relative inaccessibility for repair purposes, they must be kept both inexpensive and reliable. The present approach to accomplishing this task is based upon a system which is uncomplicated in its structure and operation. The prior art multiplex communication systems have not satisfied these requirements.

OBJECTS AND SUMMARY OF THE INVENTION

It is an object of this invention is to provide a simple and inexpensive transmission system for communicating binary data from a plurality of satellite sampling sources to a central location.

A further object of this invention is to provide single channel unidirectional communication from each of a plurality of satellite sampling sources to a central location.

These objects and the general purpose of this invention are accomplished by generating at each satellite data sampling station a bit-serial satellite message frame consisting of a synchronizing sequence, a satellite identification sequence, and the sampled data. At least a pair of these satellite message frames are multiplexed asynchronously with other pairs of bit-serial satellite message frames on a single transmission channel. The frames are demultiplexed by continually comparing all incoming bits until a first satellite identification sequence has been recovered. A subsequent satellite identification sequence and a satellite synchronization sequence is received and both satellite identification sequences are compared. A mis-match of the compared satellite identification sequences together with a correctly identified synchronization sequence indicates proper recovery of sampled data. Such sampled data is then made available for a utilization device such as a computer.

BRIEF DESCRIPTION OF THE DRAWINGS

Other objects and many of the attendant advantages of this invention will be readily appreciated as the same becomes better understood by reference to the following detailed description when considered in conjunction with the accompanying drawings in which like reference numerals designate like parts throughout the figures thereof and wherein.

DETAILED DESCRIPTION OF THE PREFERRED EMBODIMENT

Figures 1, 1A:
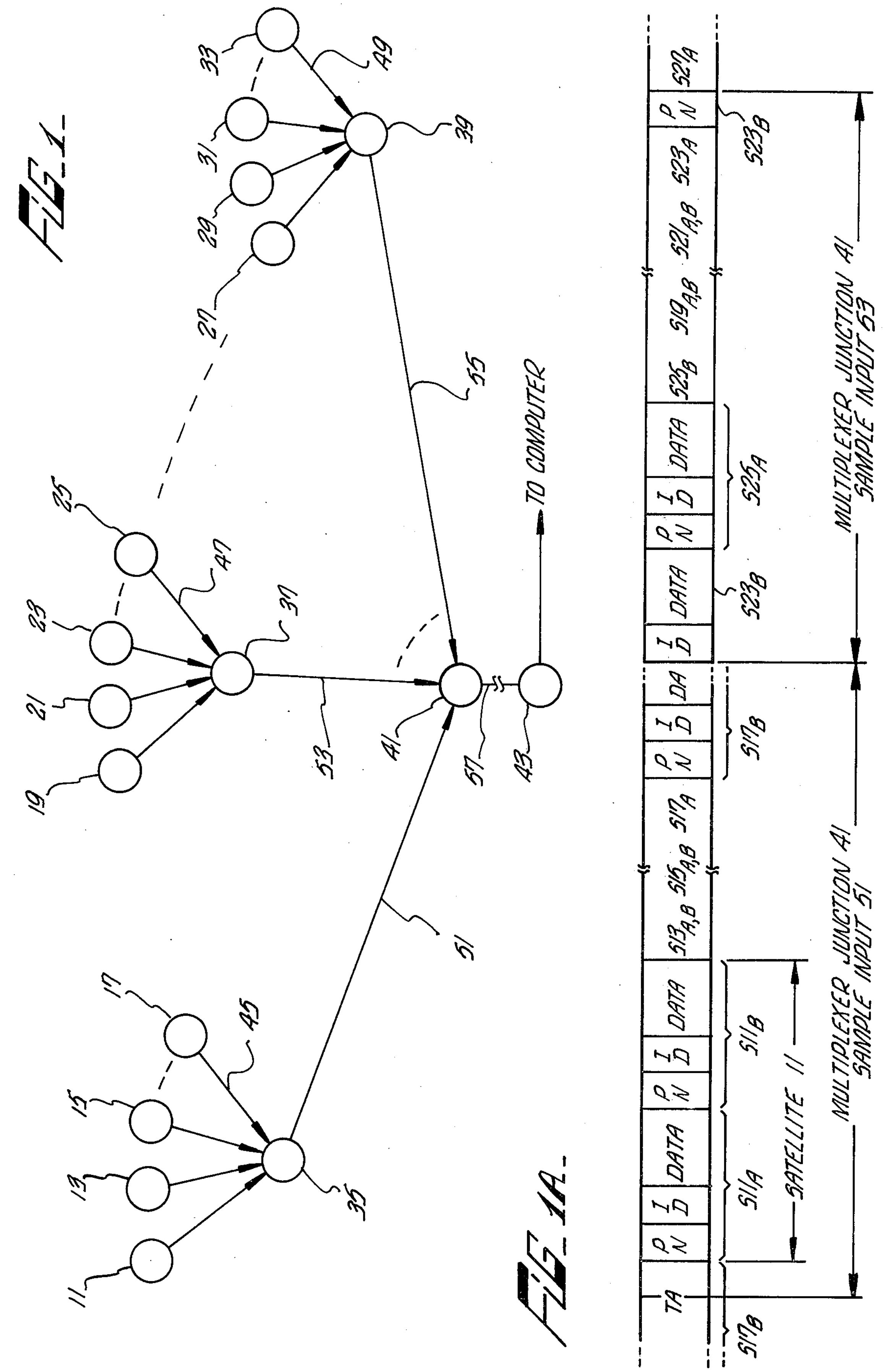
FIG. 1 abstractly illustrates a binary data multiplexed communication system according to this invention.
FIG. 1A depicts pairs of satellite message frames multiplexed for delivery to a demultiplexing and synchronizing location as shown in FIG. 1.

FIG. 1 illustrates a plurality of remote data sampling sites 11, 13, 15, 17 communicating with a multiplexer junction 35 by way of bit-serial transmission channels 45. Multiplexer junction 35 has a single channel output 51 that transmits the binary data received from sampling stations 11 through 17 in a bit-serial asynchronous time division multiplexed fashion to another multiplexer junction 41. Multiplexer junction 41 receives multiplexed messages from a plurality of other multiplexer junctions such as junctions 37 and 39. Multiplexer junction 37 is supplied from binary data sampling stations 19, 21, 23 and 25 over bit-serial transmission channel 47. Multiplexer junction 39 is supplied from a plurality of remotely located data sampling satellites 27, 29, 31 and 33 over bit-serial transmission channels 49. The outputs of these two multiplexer junctions are transmitted bit-serially in asynchronous time division multiplex format over transmission channels 53 and 55 respectively to multiplexer junction 41. Multiplexer junction 41 receives these various multiplexed message frames from transmission channels 51, 53 and 55, for example, and multiplexes them onto a single transmission channel 57 which relays the satellite message frames to a central location 43 for demultiplexing. After such received information is demultiplexed and synchronized, it may be utilized by a computer for further analysis.

Figure 2:
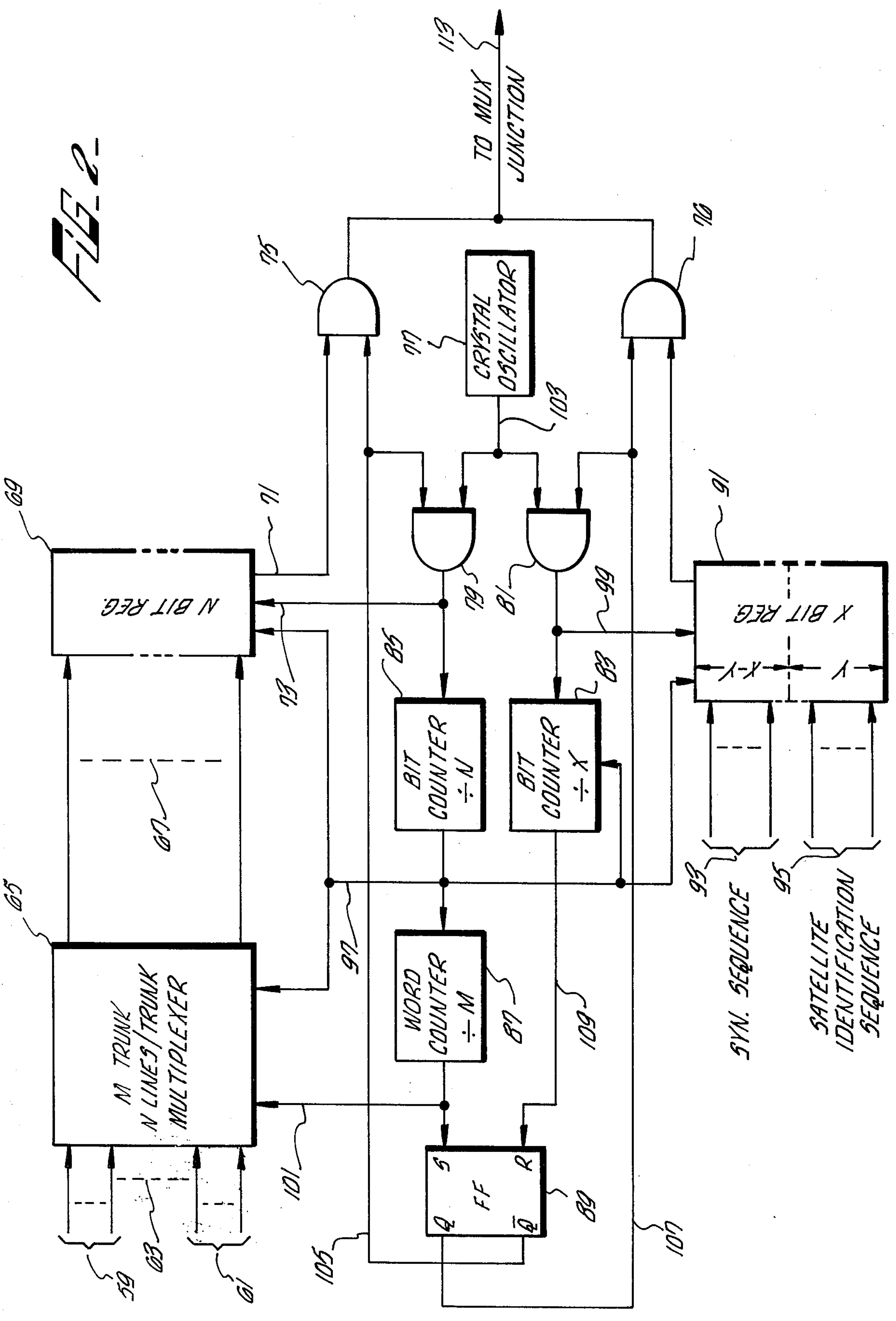
FIG. 2 is a combined block and logic diagram of each of the satellite sampling sites of FIG. 1.

Each of the remote data sampling satellites, 11 through 33, of FIG. 1 have the logic circuitry illustrated in FIG. 2 for forming satellite message frames for transmission to their respective multiplex junctions. To help comply with the requirements of low cost and high reliability, the logic circuitry shown in FIG. 2 for forming these satellite message frames may be constructed according to MSI technology.

As shown in FIG. 2, a plurality of trunks 63, with each trunk having a plurality of lines therein, carry sampled binary data to multiplexer 65. Multiplexer 65 is an M trunk to N lines multiplexer which seriatum selects one of the plurality of trunks 63 for loading, by way of parallel lines 67, a parallel-in/serial-out N bit long data sample register 69. All capital letters, as used herein, represent integers with like letters representing like integers.

Figure 3:
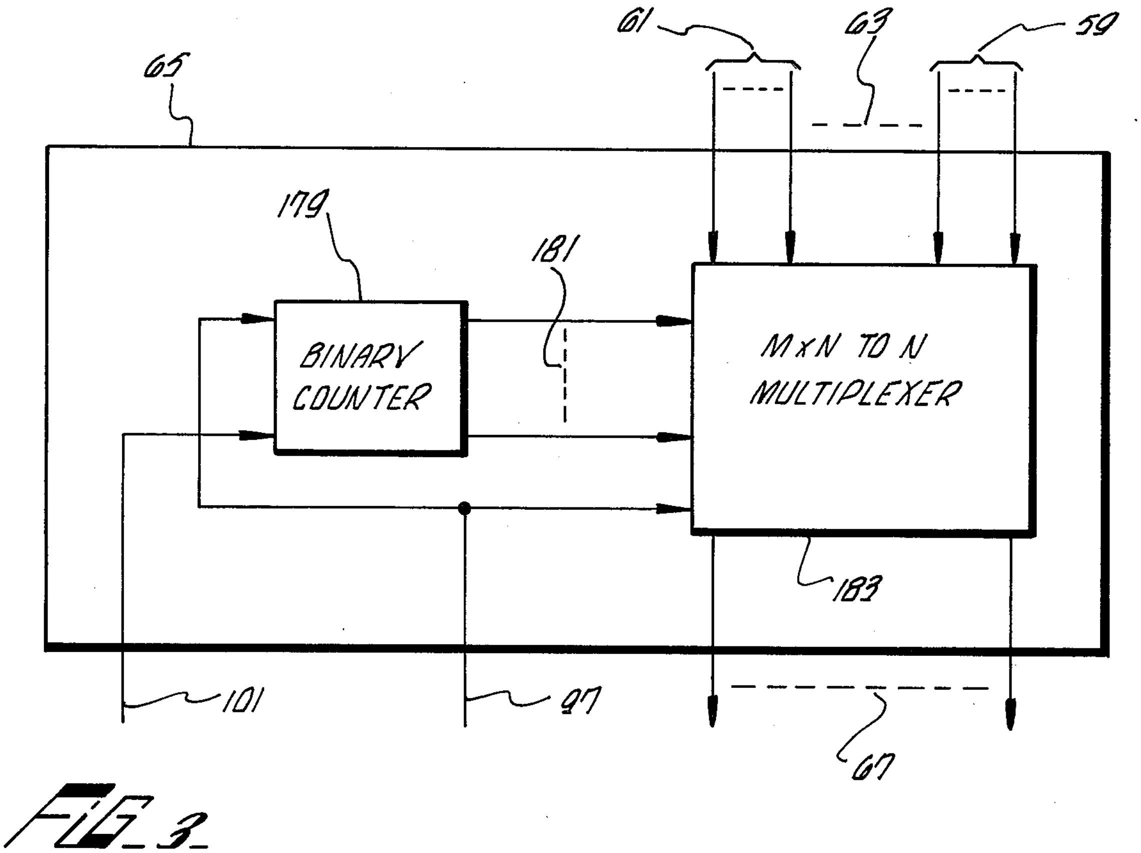
FIG. 3 is a block diagram of the M trunk multiplexer unit of FIG. 2.

Referring now to FIG. 3, the structure of the M trunk multiplexer 65 of FIG. 2 is shown to be a binary counter 179 driving an M × N to N multiplexer 183. The binary counter 179 may be a commercially available four bit binary counter integrated circuit package. The M × N inputs of the multiplexer 183 are the number of trunks times the number of lines per trunk coming into its input. The N outputs of the multiplexer 183 are the number of output lines from the multiplexer. Assuming that there are 16 trunks, 59 to 61, coming into the M × N to N multiplexer 183, the multiplexer may be constructed by utilizing any commercially available integrated circuit multiplexer chip, such as a typical chip manufactured by the Signetics Corporation and illustrated on page 1–121 of their 1972 catalogue. The number of such multiplexer chips utilized depends on the number of lines per trunk. Assuming, for example, that there are 12 lines per trunk, a twelve position multiplexer chip is utilized. These chips are connected together by tying the four address lines together in parallel. Each line of an incoming trunk is connected to the same input of a different multiplexer chip.

In addition to sampled data from register 69, a satellite identification sequence and a synchronization sequence is also supplied by the circuitry of FIG. 2. These two sequences are both supplied to a parallel-in/serial-out X bit long register 91. Register 91 has a constant external binary load input consisting of a frame synchronizing sequence 93. Sequence 93 is standard for all satellites. A binary satellite identification sequence 95, however, is unique to each satellite. This unique satellite identification sequence is another input signal to register 91. The contents of this X bit long register 91, comprising the X-Y bit long synchronizing sequence 93 and the Y bit long satellite identification sequence 95, prefix an M plurality of N bit long sampled data words in order to make up a satellite message frame.

The N bit long register 69 and the X bit long register 91 may be made up of a plurality of integrated circuit shift register chips connected in cascade, as needed, to get the required bit length. The synchronizing sequence and satellite identification sequence 93 and 95, respectively, are continuously supplied to the X bit long register 91 from a constant load binary voltage source which is preset to supply a certain parallel pattern of binary signals levels.

The particular binary bit sequence utilized for the synchronizing sequence must satisfy the requirement that it will not be found in any data sequence and that any permutation of the code will differ with the code in at least one place near the entire overlay region, as is well known. A prime PN sequence or any other prime sequence satisfies this criteria and could be used as the synchronizing sequence of this invention. Other binary codes such as the Barker of Neuman codes may also be used. The satellite identification sequence is a binary code that is unique to each satellite. The length of this code depends on the number of data sampling satellites.

The contents of the X bit long register 91 are gated out onto a transmission channel 113 through an AND gate 76. The contents of the N bit long register 69 are gated out onto the transmission channel 113 through an AND gate 75 immediately after the contents of the X bit long register 91 have been placed on the transmission channel 113.

The timing logic that regulates the flow of the serial data onto the transmission channel 113 is under the control of a crystal oscillator 77. The output of this crystal oscillator is gated through AND gates 79 and 81 to respectively drive the clocking inputs of both N bit and X bit registers 69 and 91 and a modulo N bit counter 85 and a modulo X bit counter 83. The output of the modulo N bit counter 85: (a) drives a modulo M word counter 87, (b) controls the M trunk multiplexer 65, (c) controls the loading of the N bit long register 69, (d) controls the loading of the X bit long register 91, and (e) controls the resetting of the modulo X bit counter 84. The output of the modulo X bit counter 83 resets an S-R flip flop 89. The output of the modulo M word counter 87 sets the S-R flip flop 89 and resets the M trunk multiplexer circuit 65.

The modulo M word counter 87, the modulo N bit counter 85 and the modulo X bit counter 83 may be any commercially available variable modulo counters.

Referring now to FIG. 1A, a pair of satellite message frames $S11_A$ and $S11_B$ from satellite station 11, are depicted in illustrative form. As earlier described, a satellite message frame such as $S11_A$ comprises a satellite identification sequence (shown in FIG. 1A as ID) a synchronizing sequence (shown in FIG. 1A as PN) and sampled binary data (shown in FIG. 1A simply as data). Each satellite message frame is repeated twice. Accordingly, for satellite 11, a pair of message frames $S11_A$ and $S11_B$ are depicted in FIG. 1A. Similarly each other satellite position, such as positions 13, 15 and 17 also provide a pair of satellite message frames each. The dual frames for positions 13 and 15 are shown simply as $S13_{A,B}$ and $S15_{A,B}$ in FIG. 1A. At satellite position 17, $S17_A$ and the component parts of $S17_B$ are depicted in FIG. 1A. Multiplexer junction 35 assures capture of these dual message frames by pausing long enough at each satellite position so that a set of dual frames have been outputted from all satellite positions for that multiplex junction.

It was noted earlier that multiplexer junctions 35, 37, 39 and 41 are asynchronous. Accordingly, multiplexer junction 41 need not start sampling the on the single transmission line 51 at any particular time. However, multiplexer junction 41 must pause at the single transmission line 51 long enough to assure that a complete set of dual frames for satellite positions 11 through 17 have been captured. As shown in FIG. 1A, multiplexer junction 41 initiates a sample time prior to $S11_A$ and during data emission from satellite position 17's second frame, $S17_B$. That sample frame then exists for a time interval that assures capture of the satellite ID, PN and data for positions $S11_A$ through $S17_A$ and ID, PN and part of data for $S17_B$. Thus, a complete set of dual frames are captured irrespective of the starting place by multiplexer junction 41.

In a similar manner, satellite multiplexer 37 always pauses long enough at each of its satellite positions 19 through 25 to capture a set of dual frames. In a similar manner, multiplex junction 41 breaks in at a time which is unrelated to the events at satellite locations 11 through 17. Thus, the second sample for multiplexer junction 41 at transmission line 53 captures a part of the data for a second frame sequence, $S23_B$, from position 23. Again, however, a set of dual satellite message frames are captured for all satellite positions 19 through 23 by multiplexer junction 41. The described operation is also true for satellite positions 27 through 33 and for multiplexer 39 and transmission line 55. The dual satellite message frames play an important part of demultiplexing and achieving synchronization at central location 43, FIG. 1. This feature of my invention is described in detail in conjunction with FIG. 5, after the logic for a multiplexer junction is described.

Figure 4:
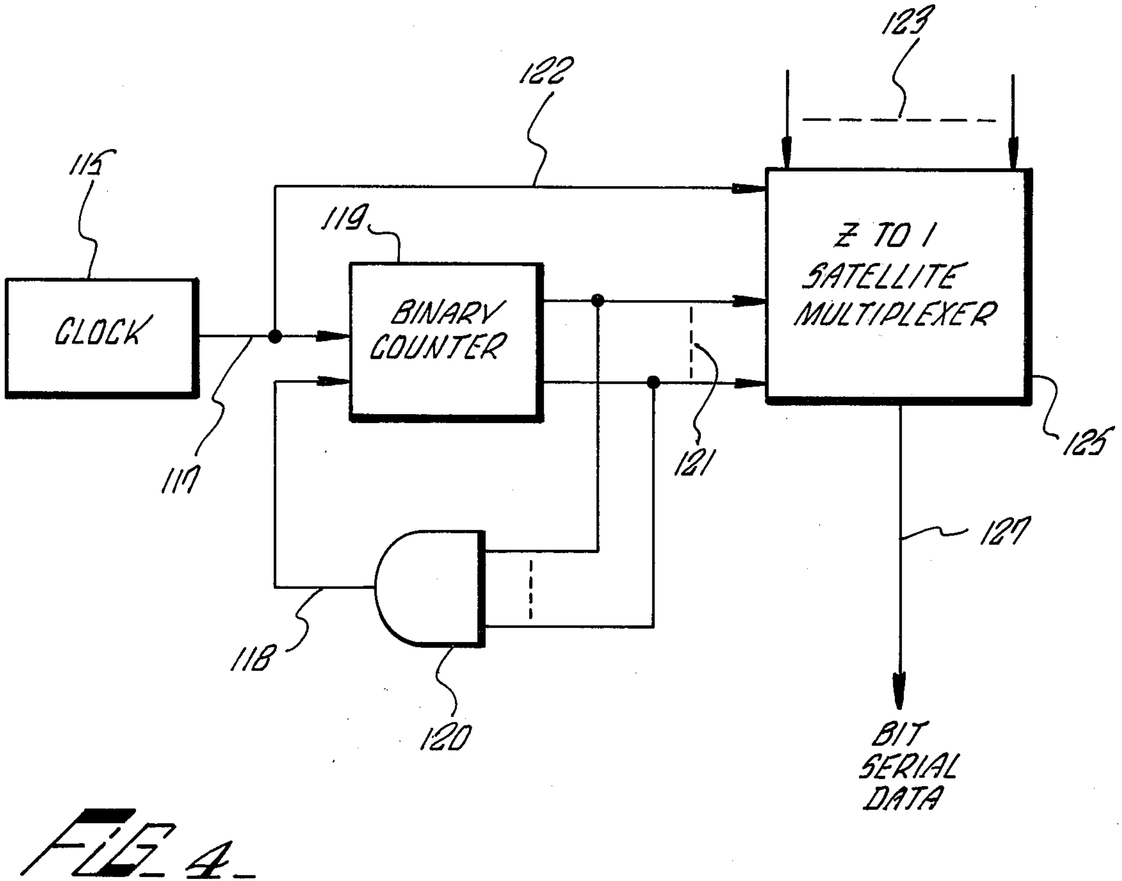
FIG. 4 is a combined block and logic diagram of the plurality of multiplexer junctions of FIG. 1.

Referring now to FIG. 4, a multiplexer junction is shown as comprising a clock source 115 driving a binary counter 119 which addresses a Z to 1 satellite multiplexer 125. A logic circuit, such as multiple input AND gate 120 is connected to reset the binary counter 119 after it has run through a desired count cycle. The clock source 115 may be a free running multivibrator such as is well known in the art. Similarly, the binary counter 119 and multiplexer 125 may be commercially available integrated circuits. Clock source 115 is chosen with an output frequency selected so that each satellite junction emits a dual satellite frame for a multiplexer junction such as junctions 35, 37 and 39. In a similar manner, multiplexer junction 41 has a clock source selected at a frequency which assures a complete set of dual frames are transferred over line 57, FIG. 1, for each of multiplexer junctions 35, 37 and 39, FIG. 1.

Figure 5:
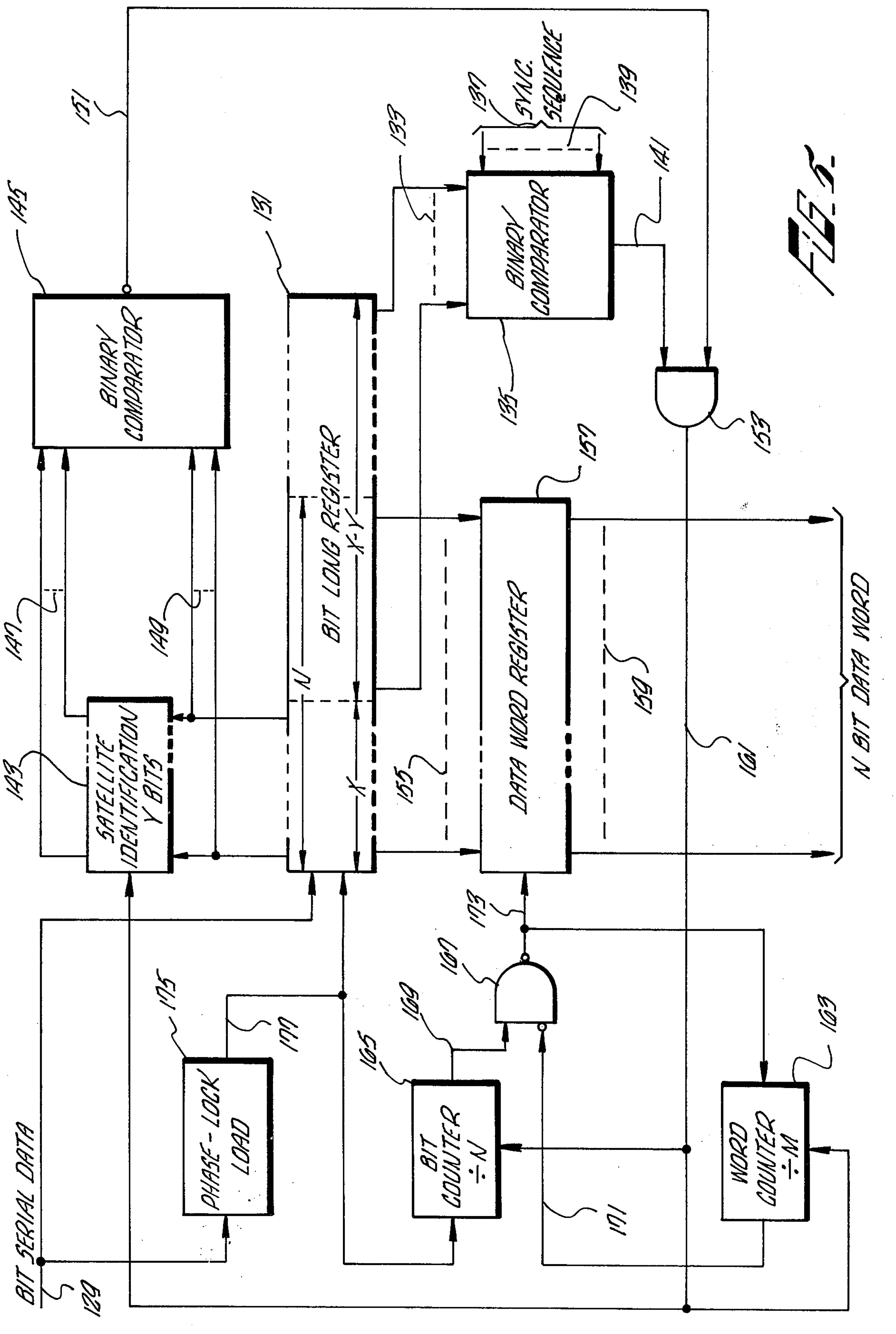
FIG. 5 is a combined block and logic diagram of the demultiplexing and synchronizing circuits at the central data collecting location of FIG. 1.

Referring now to FIG. 5 for the structure of the demultiplexer and synchronizer at a central location, the bit-serial asynchronously multiplexed binary data is received on an input line 129 and clocked into a serial-in/parallel-out X bit long register 131. A phase lock loop 175 which is synchronized to the frequency of the incoming bit-serial data supplies clocking signals to the X bit long register 131. In addition, the clock output of the phase lock loop 175 drives a modulo N bit counter 165. The output of the modulo N bit counter 165 is gated through an AND gate 167 to clock a parallel-in/parallel-out data word register 157. The output of AND gate 167 is also supplied to the input of a modulo M word counter 163.

A Y bit long parallel-in/parallel-out satellite identification register 143 has its input connected to the first Y bit positions of the X bit long register 131. The binary bits being continually clocked into the X bit long register 131 are supplied as a first input to a binary word comparator 145 while they are in the Y bit sections of the register 131. The output of the satellite identification register 143 is supplied as the other input to the binary comparator circuit 145. The output of the binary comparator circuit 145 is supplied as a first input to an AND gate 153. The other input to this AND gate is the output of another binary comparator circuit 135. Comparator circuit 135 receives a plurality of bits from the X-Y bit section of the X bit long register 131, which is the synchronizing sequence section of that register, and compares it with the standard synchronizing sequence 139 received from a constant load source, such as is well known in the art for generating a plurality of parallel binary signals.

Reference to FIG. 1A discloses that irrespective of any particular starting locating, due to the asynchronous operation, dual frames assure complete identification and location of sampled data. The demultiplexer and synchronizing circuit of FIG. 5 utilizes phase lock loop 175 to clock binary data into register 131, without any regard to the location of satellite identification and synchronization sequences as such sequences are unknown at this point of the operation. Binary comparators 135, 145 and satellite identification circuit 143 cooperate to locate and identify the satellite identification and synchronizing sequences. After these sequences are identified, the bit and word counters 163 and 165 synchronize gating of sampled data from data word register 157.

The phase lock loop circuit 175, FIG. 5, may be the type designed by the instant inventor and fully described and illustrated in the December, 1973 issue of COMPUTER DESIGN magazine on pages 90 through 92. The X bit long register 131 may be constructed by cascading a plurality of serial-in/parallel-out commercially available register chips. The number of such chips utilized is dependent on the bit length required for register 131. The modulo N bit counter 165 and the modulo M word counter 163 may be the same type as utilized in the remote satellite sampling station of FIG. 2. The binary word comparators 145 and 135 may be constructed by cascading a plurality of commercially available comparator chips.

Turning now to a more detailed functional description of the operation of the multiplexed binary data communication system, reference will be made first to FIG. 3 to explain the operation of the M trunk multiplexer 65 shown in block form in FIG. 2. Binary signals are supplied over each of the lines in the plurality of trunks 63 leading into the M × N to N multiplexer 183. A particular trunk, such as trunk 59, is selected by the multiplexer 183 for transmitting its binary signals in parallel over signal lines 67 to the N bit long register 69, FIG. 2. The particular trunk chosen, at any one moment, is determined by the binary address bits supplied to the multiplexer 183 over the parallel lines 181 from binary counter 179. The binary counter 179 is driven by the output of modulo N bit counter 85, FIG. 2, over line 97. Every time bit counter 85 generates an output, binary counter 179 is augmented one count. Simultaneously, the same output signal on lead 97 is supplied to the multiplexer 183 in order to inhibit its multiplexing function while the binary counter 179 is being stepped to its next binary count. An output signal from modulo M word counter 87, FIG. 2, is supplied, over line 101, FIG. 3, to binary counter 179 of the M trunk multiplexer 65 to reset counter 179 to zero. As a result, binary counter 179 sequentially counts through a plurality of states until each of the trunks terminating at the input of multiplexer 183 has been selected. After that sequential count, the binary counter 179 is reset by a signal on line 101. Thereafter, counter 179 begins selecting trunks from the beginning of its sequence which is repeated by the operation just described.

A crystal oscillator 77 of FIG. 2 controls the frequency at which the data bits from register 69 and the synchronization and satellite identification sequences bits from register 91 are transferred onto transmission channel 113. Depending on the state of S-R flip flop 89, the clocking signal from the crystal oscillator 77 on line 103 is gated through either AND gate 79 or 81. Assuming that flip flop 89 is in its set state, the Q output terminal is high and the $\overline{Q}$ output terminal is low. A binary high signal, generated on line 107, is supplied to the input of AND gate 81 and the input of AND gate 76, enabling both gates. As a result, the clocking signal on line 103 is only passed by AND gate 81 since AND gate 79 is supplied with a binary zero or low lead on line 105, causing it to be disabled.

The clock signal from crystal oscillator 77 is gated through AND gate 81 over line 99 to the clocking input of the X bit long register 91, causing the contents of this register to be serially clocked out to and through AND gate 76 onto transmission channel 113 in a well known manner. As each binary bit is clocked from register 91, the modulo X bit counter 83 is incremented. The modulo of the X bit counter 83 is set to equal the bit length of the X bit long register 91. Accordingly, when the last bit has been clocked out of the X bit register 91, the modulo X bit counter 83 generates an output signal on line 109. This signal is supplied to the reset input of S-R control flip flop 89 causing its Q output to go low and its $\overline{Q}$ output to go high. This status of flip flop 89 disables AND gates 81 and 76 and, due to the high level supplied over line 105, enables both AND gates 79 and 75.

With control flip flop 89 reset in the manner described, the output signal from crystal oscillator 77 is gated through AND gate 79 over line 73 to the clocking input of N bit long register 69. Bits of data contained in the N bit register 69 are serially clocked out over line 71 through enabled AND gate 79 onto the transmission channel 113. During the same time, clocking signals from crystal oscillator 77 are supplied to modulo N bit counter 85. Counter 85 generates a binary one signal output every time all the bits stored within the N bit long register 69 have been clocked out.

The output of modulo N bit counter 85 on line 97 is supplied to the M × N to N multiplexer 183 and binary counter 179, FIG. 3, causing the binary counter to advance to its next counting state. An output signal on line 97 is, at the same time, supplied to the N bit long register 69 to load the N bit register 69. Register 69 is loaded with the signals presented, over parallel lines 67 from multiplexer 65. Simultaneously, an output signal on line 97 is supplied as a reset pulse to the input of modulo X bit counter 83. This reset pulse causes counter 83 to reset to zero. With counter 83 reset to zero, the binary high from line 109 is removed from the R input terminal of the flip flop 89. The same output signal on line 97 is also supplied to the load input of the X bit register 91 for loading the synchronizing sequence and the satellite identification sequence into register 91. Modulo M word counter 87 is incremented by one as a result.

The above-described sequence continues, causing N bit register 69 to be loaded and unloaded in the above-described manner, until the modulo M word counter 87 sequences. Counter 87 has a division factor, M, which is equal to the number of trunks terminating at the input of the multiplexer 65. After its sequence is completed, counter 87 generates an output signal. This output signal from counter 87 is supplied over line 101 to the reset input of binary counter 179, FIG. 3, and to the set input of control flip flop 89 causing the $\overline{Q}$ output to go low and the Q output to go high. A set condition in flip flop 89 again enables AND gates 81 and 76 causing the bits in X bit long register 91 to be serially transferred onto the transmission channel 113. The above-described sequence repeats itself continuously in the order described.

Referring now to FIG. 4, single line transmission channels are applied to multiplexer 125. One channel each from a plurality of satellite sampling stations, is supplied to a Z to 1 multiplexer 125. Z is equal to the number of input transmission channels 123 being received. Multiplexer 125 selects a particular input transmission channel to be connected to the single output transmission channel 127 for a given amount of time as determined by the frequency of the clock signal from the clock source 115. Because of the asynchronous multiplexing scheme, dual frames from each satellite location must be transferred. The frequency of clock source 115, therefore, is selected to assure that dual frames are transmitted. This clock frequency is set the same for each satellite junction multiplexer.

Each time clock source 115 supplies a clocking signal on line 117 to the binary counter 119, this same clocking signal is supplied, on line 122, to inhibit multiplexer 125. Multiplexer 125 is thus inhibited while binary counter 119 is stepped to its next count state. The plural input AND gate 120, FIG. 4, detects when binary counter 119 has reached its desired count state. AND gate 120 generates a reset signal on line 118 to reset binary counter 119 to zero.

Each count state for binary counter 119 as just described causes multiplexer 125 to select, in order, one input transmission channel from the plurality of transmission channels 123 for connection to an output channel 127. Output signals from multiplexer 125, on channel 127, are supplied as one of a plurality of inputs to another multiplexer junction of like construction such as multiplexer junction 41 of FIG. 1. As an alternative, of course, such output signals may be supplied directly to the demultiplexer apparatus of FIG. 5 rather than passing through intermediate multiplexer junction 41, FIG. 1

Assume that bit-serial data placed on channel 127 in the format of FIG. 1A is transmitted directly to the demultiplexer of FIG. 5. As shown in FIG. 5, data comes in on channel 129. This data is serially clocked into the X bit long register 131 by the clock output from phase lock loop 175. Phase lock loop 175 is synchronized to the incoming bit serial data rate in any well known manner. Output signals from circuit 175 are also supplied as input signals to the modulo N bit counter 165. Bit counter 165 is not cleared however until AND gate 153 generates a high signal level on line 161. A high signal on line 161 also resets the word counter 163 to zero so that both counters may start counting from a zero or reset condition. This high signal also causes the satellite identification register 143 to be loaded with appropriate bits from the X bit long register 131. As noted earlier, the location of a satellite identification sequence and its associated synchronization sequence must be determined in order to start the demultiplexing operation. Bits are continually being stored in register 131 via input lead 129 under clock signals from circuit 175. At each clock time, binary comparator 135 receives X minus Y bits over a parallel path 133 and compares them with a standard synchronizing sequence 137 supplied to it over parallel path 139. Assuming that a match occurs, the binary comparator 135 generates a binary one or high signal on line 141. This high signal is one enabling term for AND gate 153.

Within this same clock time, the Y bits in the X bit long register 131 are supplied to the Y bit satellite identification register 143 and to binary comparator 145 over input lines 149. The contents of the satellite identification bit register 143 are at the same time being supplied to the binary comparator 145 over parallel output lines 147. Assuming that a mis-match between the two binary input words to the binary comparator 145 occurs, a binary one or high output on line 151 is generated. This signal, in combination with the binary one output from comparator 135 on line 141 enables gate 153, which gate, in turn, generates a binary one or high signal on line 161. As earlier described, this high signal level resets both counters 165 and 163 and causes the satellite identification register 143 to be loaded with the Y bit sequence supplied to it over parallel input path 149.

Modulo N bit counter 165 is incremented in response to each clock signal on line 177 from the phase lock loop 175. The bit counter 165 generates a binary one or high signal output on line 169 when it has been incremented N times, N being the bit length of a first data word which, of course, includes the satellite identification sequence. When this occurs, N bits plus the ID have been clocked into the X bit long register 131. The output of bit counter 165 is gated through AND gate 167, over line 173, to the data word register 157 causing it to be loaded with the bits from the X bit long register 131. AND gate 167 is enabled by the binary zero or low output on line 171 from the word counter 163, generated as a result of the word counter being reset by the binary one signal from AND gate 153.

The modulo M word counter 163 is incremented each time the bit counter 165 generates an output signal. The above-described sequence continues, that is, one data word after another is removed from the data word register 157 after it has been transferred from register 131. Parallel output lines 159 supply the bits to utilization equipment, until the word counter 163 has been incremented M times. M, as described earlier, is the number of words in a satellite message frame. At this time, the word counter 163 generates a binary one or high signal on line 171 which is negated at the input of AND gate 167 thereby disabling AND gate 167 and preventing any further output signals from the bit counter 165 reaching the data word register 177 or incrementing the word counter 163.

The above-described sequence of identifying the start of a satellite message frame is then again repeated. The condition that the X - Y sequence in the X bit long register 131 matches the synchronizing sequence 137; and that the Y sequence in the X bit long register 131 does not match the sequence, as previously stored, in the satellite identification register 143 indicates the start of a new data message frame. This condition causes resetting of bit counter 165 and word counter 163. AND gate 167 is again enabled. After this occurs, the bit counters again work in conjunction to synchronously remove the data words from the X bit long register 131.

In summary, a simple, inexpensive transmission system for communicating binary data from a plurality of satellite sampling sources to a central location has been disclosed. This single channel communication system displays an extraordinary simplicity and is, therefore, reliable and maintenance free. Obviously, many modifications and variations of the present invention are possible in light of the above teachings. It is, therefore, to be understood that within the scope of appended claims, the invention may be practiced otherwise than as specifically described.

What is claimed is:

1. A unidirectional, single channel communication system for transmitting binary data from a plurality of satellite data sampling sites to a central location, comprising:

means at each of said satellite data sampling sites for forming of a pair of satellite message frames each having a binary synchronizing sequence, a satellite identification sequence and data words;

means responsive to received satellite message frames from said plurality of sampling sites for asynchronously multiplexing a pair of frames from each satellite location onto a single transmission channel; and satellite message receiving means at said central location for synchronizing and demultiplexing a frame in accordance with the satellite identification sequence, the binary synchronizing sequence and the data words per frame.

2. The unidirectional, single channel communication system of claim 1 wherein said satellite message frame forming means comprises:

an N bit long register for receiving N bits of sampled data;

an X bit long register for receiving Y bits of satellite identification sequence and X-Y bits of satellite message frame synchronizing sequence;

means for serially transferring said X bits from said X bit long register to said multiplexing means; and means operative immediately after said X bits have been transferred for transferring N bits from said N bit long register to said multiplexing means until M × N bits have been transferred.

3. The unidirectional, single channel communication system of claim 2 wherein said X bit serial transferring means, comprises:

a source of clocking signals;

a modulo X bit counter driven by said source of clocking signals; and logic circuit means responsive to the output of said modulo X bit counter for disabling application of the clocking signals to said modulo X counter.

4. The unidirectional, single channel communication system of claim 2 wherein said N bit serial transferring means, comprises:

a source of clocking signals;

a modulo N bit counter driven by said source of clocking signals;

a modulo M bit counter driven by the output of said modulo N bit counter; and logic circuit means responsive to the output of said modulo M bit counter for disabling application of the clocking signals to said modulo N counter.

5. The unidirectional, single channel communication system of claim 1 wherein said satellite message frame multiplexing means, comprises:

a Z to 1 multiplexer circuit;

a binary counter means addressing said Z to 1 multiplexer circuit; and a source of clocking signals connected to and driving said binary counter means.

6. The unidirectional, single channel communication system of claim 5 wherein said source of clocking signals has a signal frequency rate that permits at least a pair of satellite message frames to pass serially through said Z to 1 multiplexer circuit before another satellite is selected.

7. The unidirectional, single channel communication system of claim 1 wherein said demultiplexing means comprises:

an X bit long register means for serially receiving the plurality of multiplexed satellite message frames; and a phase lock loop clocking the bits of the received message frames into said X bit long shift register, said serially received satellite message frames also being supplied to the input of said phase lock loop.

8. The unidirectional, single channel communication system of claim 7 wherein said demultiplexing means further comprises:

means for continuously comparing X-Y bits of a standard synchronizing sequence with X-Y bits in said X bit long register means;

a Y bit long satellite identification sequence register means for storing the previously received identification sequence; and means for comprising the Y bits of the identification sequence in said X bit long register means and the Y bits of the identification sequence in said Y bit long register means, whereby the start of a new satellite message frame is identified.

9. The unidirectional, single channel communication system of claim 8 further comprising:

a modulo N bit counter means clocked by the clock output of said phase lock loop for transferring N bit long words from said X bits long shift register; and a modulo M bit counter means clocked by the output of said modulo N bit counter for inhibiting the further transfer of N bit long words from said X bit long register means.

10. The unidirectional, single channel communication system of claim 1 wherein said demultiplexing means comprises:

means for continuously comparing the bits of a standard synchronizing sequence with the bits in received satellite message frames; and means for continuously comparing the bits of a previously received satellite identification sequence with the bits in a subsequently received satellite message frame; and logic means responsive to said satellite identification comparing means and said synchronizing sequence comparing means for emitting a signal indicative of the start of a new satellite message frame.

11. The unidirectional, single channel communication system of claim 10 and further comprising:

means responsive to said synchronizing sequence comparison means for emitting a signal when the compared signals match;

means responsive to said satellite identification sequence comparison means for emitting a signal when the compared signals do not match; and means applying said emitted signals to said logic means.

* * * * *